M. K. McGRATH.

CONDENSER AND PROCESS OF MAKING SAME.

APPLICATION FILED APR. 6, 1907.

12,860. Reissued Oct. 6, 1908.

Witnesses:
Geo. C. Dawson
Alfred H. Moore.

Inventor:
Maurice K. McGrath,
By Barton, Sauer & Folk
Attys.

UNITED STATES PATENT OFFICE.

MAURICE K. McGRATH, OF ANTWERP, BELGIUM, ASSIGNOR TO WESTERN ELECTRIC COMPANY, CHICAGO, ILLINOIS, A CORPORATION OF ILLINOIS.

CONDENSER AND PROCESS OF MAKING SAME.

No. 12,860. Specification of Reissued Letters Patent. Reissued Oct. 6, 1908.

Original No. 825,405, dated July 10, 1906, Serial No. 133,014. Application for reissue filed April 6, 1907. Serial No. 366,865.

*To all whom it may concern:*

Be it known that I, MAURICE K. McGRATH, a citizen of the United States, residing at Antwerp, in the Kingdom of Belgium, have invented a certain new and useful Improvement in Condensers and Processes of Making Same, of which the following is a full, clear, concise, and exact description.

My invention relates to a condenser and process of making the same; and its object is to produce an improved condenser which shall be extremely compact, of small dimensions, and cheap to manufacture, while possessing increased efficiency, permanence, and durability.

My invention broadly consists of a condenser in the form of a compressed prism composed of continuous conducting strips separated by insulating strips and also of the process of constructing such condenser.

More specifically, my invention consists in the process and the product resulting from first assembling sheets of conducting and insulating material in the form of a flat roll, folding said roll, and then compressing the same into the form of a rectangular prism.

In accordance with my invention I preferably first assemble the strips of foil and paper by rolling them together upon a flat arbor, then fold this flat roll reversely into an S-shape or complete zigzag, and finally, after having boiled the folded condenser in melted paraffin-wax or the like, I subject it to pressure on all sides in a mold, while allowing the wax to cool and set. The completed condenser in the form of a prism may be inclosed in a suitable metal case for protection and to prevent it from unfolding.

I will describe my invention particularly by reference to the accompanying drawings, and that which I consider to be novel with me will be pointed out broadly in the appended claims.

Figure 1:
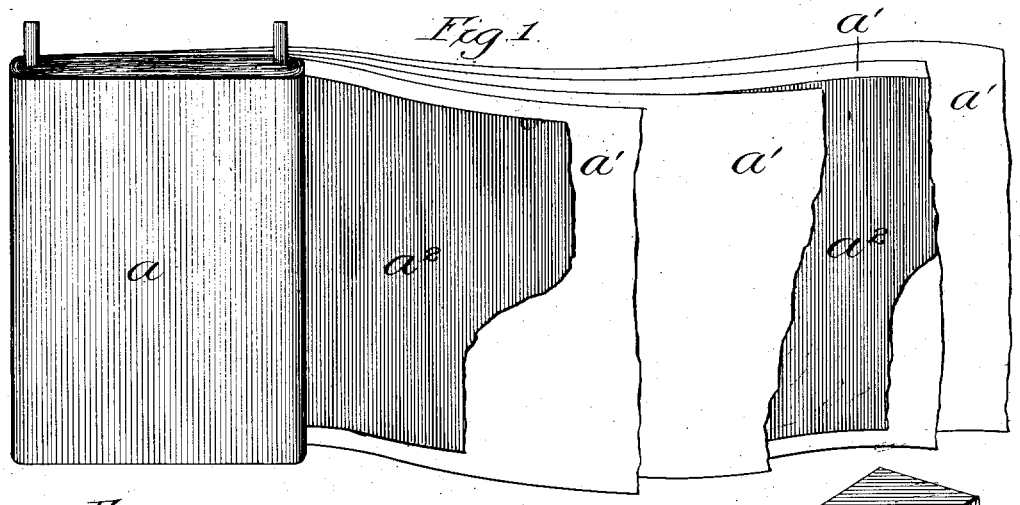
Figure 3:
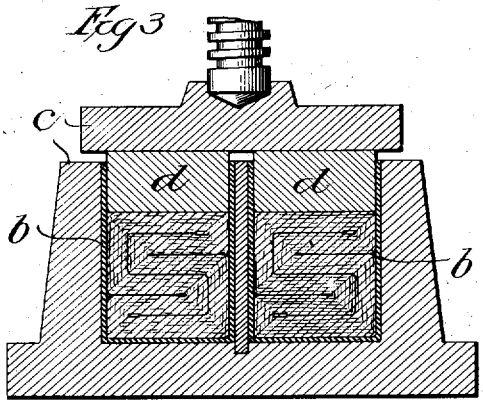
Figure 2:
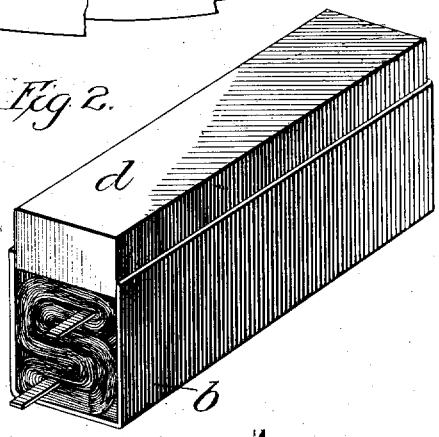
Figure 4:
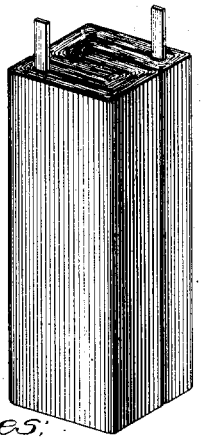
Figure 5:
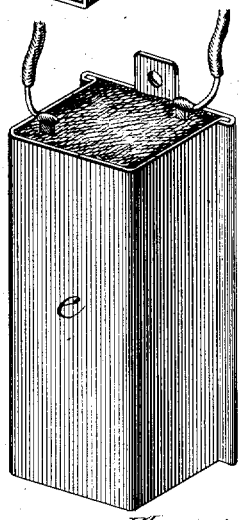

Figure 1 is a perspective view illustrating the paper and tin-foil strips assembled in a flat roll; Fig. 2 shows this roll reversely folded into an S-shape and placed in the square mold, in which it is to be boiled in paraffin and finally pressed; Fig. 3 shows the pressing operation; Fig. 4 is a view of the condenser after pressing; and Fig. 5 shows the same inclosed in its protecting tin case.

Similar letters of reference are used to designate the same parts wherever shown.

It has been usual heretofore in making condensers to roll up four sheets of paper $a'$ and two sheets of tin-foil $a^2$ of the required width into a flat roll $a$, as shown in Fig. 1, this roll then being boiled in paraffin and pressed flat on two sides. Condensers have also been made by rolling the flat roll into substantially cylindrical shape and inclosing the same directly in a cylindrical case without pressure; but in accordance with my invention the flat roll $a$ is folded preferably reversely, into an S-shape, as shown in Fig. 2, and placed in the rectangular mold or trough $b$, with the doubled ends of the roll at the top and bottom. A rectangular wooden block $d$ is then placed in the trough on top of the roll $a$ and the whole boiled for, say, two or three hours in melted paraffin. After the boiling a number of the troughs containing the folded condensers are placed side by side in a press $c$ and pressure applied to top and bottom, forcing the blocks $d$ downward into the troughs or molds in the manner of plungers, so that the folded roll is compressed in the bottom of the trough, and subjected, in effect, to pressure on all four sides. The pressure is maintained until the paraffin has thoroughly hardened after which the condenser, appearing as shown in Fig. 4, is removed and finally placed in its tin protecting-case $e$, as shown in Fig. 5. Said case is constructed and sealed in a manner to hold the condenser tightly and prevent the leaves from separating.

A condenser of two microfarad capacity can be made, as above described, in the form of a prism an inch and a half square and four inches long, while a condenser of the same capacity, made according to the old plan, would be twice as long, twice as wide, and a third as thick, using twice the material and costing, approximately, twice as much as mine. The increased capacity with a given amount of material in my condenser is probably due to the fact that the pressure upon the folded roll forces the leaves into much more intimate contact with one another. The capacity of an ordinary flat condenser is liable to become reduced with age, due to the separation of the leaves; but in my folded form this will not be so liable to happen, because the leaves cannot separate to any appreciable extent without a straightening out of the folds, which is of course prevented by the inclosing case. There are many ways in which the paper strips may be shaped into a prismatic form; but I prefer the S-shaped fold, because here the laminæ are nearly all of equal length and there is less tendency for the foil to wrinkle and separate than in the other forms. In general, the distortion of the laminæ and displacement at the ends may be prevented by merely folding the flat roll; but the folding of the roll two or more times to form a complete zigzag fold is desirable.

It will be observed, as shown in Fig. 2, that the condenser before being compressed is in the form of a thick roll having a shorter and a longer transverse axis at approximately right angles to each other, and that the block *d* is pressed downward in the direction of the longer axis. The width of the mold *b* being substantially equal to the shorter axis of the roll, the result of the pressure is that the condenser is compressed into a prismatic form of approximately square cross section, as above stated.

I claim:—

1. The herein described process of making condensers, which consists in assembling the strips of foil and insulating material in a flat roll, folding said flat roll, treating the same with melted wax or the like, and finally subjecting the folded roll to continual pressure on all sides while allowing the wax to cool and set.

2. The herein-described process of making condensers, which consists in assembling strips of foil and paper in a flat roll, reversely folding the flat roll into an S-shape, treating the same with melted paraffin wax or the like, placing the folded roll in a narrow rectangular mold and subjecting the same to continued pressure while allowing the wax to cool and set.

3. An electric condenser consisting of a flat roll of alternate layers of conducting and insulating material reversely folded two times or a multiple thereof, whereby distortion of the laminæ is prevented.

4. A condenser comprising a flat roll of strips of foil and paper reversely folded in a complete zigzag, paraffined, and pressed.

5. A condenser comprising strips of paper and tin-foil, assembled and folded reversely into an S-shape, and finally pressed on four sides, the pressure being sufficient to produce intimate contact between the strips of foil and insulating material where the same are folded.

6. The herein-described process of making condensers, which consists in rolling and folding strips of paper, and tin-foil reversely into an S-shape, treating the same with melted wax, and subjecting the same to pressure on all sides in a mold while allowing the wax to cool and set, the pressure being applied in such a way as to force all adjacent portions of said strips into intimate relation; whereby maximum capacity for a given amount of material is obtained.

7. The process of making condensers which consists in assembling plates and dielectrics into a thick roll having a shorter and a longer transverse axis at approximately right angles to each other, placing said roll in a rectangular mold having a width approximately equal to said shorter axis of the roll, and applying pressure in such manner as to shorten the longer axis of the roll and to press said roll into a prism.

8. A condenser in the form of a rectangular prism, composed of a folded roll of conducting and insulating strips subjected to pressure upon all sides of said prism.

9. A condenser in the form of a prism composed of a folded flat roll of conducting and insulating strips, said strips being held in intimate contact throughout their surface by insulating binding material set under pressure applied on all sides of said prism.

In witness whereof, I hereunto subscribe my name this 21st day of March, A. D. 1907.

MAURICE K. McGRATH.

Witnesses:

G. De Lersy,

C. F. Baldwin